US011636354B1

(12) United States Patent
Podgorny et al.

(10) Patent No.: US 11,636,354 B1
(45) Date of Patent: *Apr. 25, 2023

(54) SYSTEM AND METHOD FOR MANAGING SOCIAL-BASED QUESTIONS AND ANSWERS

(71) Applicant: INTUIT INC., Mountain View, CA (US)

(72) Inventors: Igor A. Podgorny, San Diego, CA (US); Nima Sarshar, Morgan Hill, CA (US); Todd Goodyear, San Diego, CA (US); Bradly Feeley, La Mesa, CA (US)

(73) Assignee: INTUIT INC., Mountain View, CA (US)

( * ) Notice: Subject to any disclaimer, the term of this patent is extended or adjusted under 35 U.S.C. 154(b) by 1179 days.

This patent is subject to a terminal disclaimer.

(21) Appl. No.: 16/194,755

(22) Filed: Nov. 19, 2018

Related U.S. Application Data (63) Continuation of application No. 14/216,675, filed on Mar. 17, 2014, now Pat. No. 10,140,578.

(51) Int. Cl.
*G06N 5/04* (2006.01)
*G06N 20/00* (2019.01)
*G06Q 40/12* (2023.01)

(52) U.S. Cl.
CPC .............. *G06N 5/04* (2013.01); *G06N 20/00* (2019.01); *G06Q 40/123* (2013.12)

(58) Field of Classification Search
CPC ......... G06N 5/04; G06N 20/00; G06Q 40/123
See application file for complete search history.

(56) References Cited

U.S. PATENT DOCUMENTS

| 8,165,997 | B1 | 4/2012 | Podgorny et al. |
| 8,311,792 | B1 | 11/2012 | Podgorny |
| 8,341,167 | B1 | 12/2012 | Podgorny |
| 8,386,966 | B1 | 2/2013 | Attinasi |

(Continued)

OTHER PUBLICATIONS

Kafle et al. "An Analysis of Visual Question Answering Algorithms" 2017 IEEE International Conference on Computer Vision (ICCV) Year: 2017.

(Continued)

*Primary Examiner* — Florian M Zeender
*Assistant Examiner* — Milena Racic
(74) *Attorney, Agent, or Firm* — DLA Piper LLP (US)

(57) ABSTRACT

A computer-implemented method of managing questions and answers on a computer-hosted service. The method includes a computing device receiving text based tax question and answer pairings and inputting the tax question and answer pairings into a content model executed by the device and outputting a content score for each tax question and answer pairing based on the model. The content score comprises a number within a range. One end of the range corresponds to product content and another end of the range corresponds to general tax content. The device outputs an answer quality score for the tax question and answer pairings based at least in part on the content score and votes assigned to each respective question and answer pair, wherein votes comprises up votes and down votes. The device may generate a FAQ list stored in a database based at least in part on the answer quality score.

19 Claims, 9 Drawing Sheets

(56) References Cited

U.S. PATENT DOCUMENTS

| | | | |
|---|---|---|---|
| 8,463,756 B2 | 6/2013 | Sarshar | |
| 8,468,110 B1 | 6/2013 | Podgorny | |
| 8,670,968 B1 | 3/2014 | Podgorny | |
| 8,806,444 B1 | 8/2014 | Podgorny | |
| 8,935,192 B1* | 1/2015 | Ventilla | G06Q 50/01 |
| | | | 706/50 |
| 8,949,198 B2 | 2/2015 | Sarshar | |
| 9,349,135 B2 | 5/2016 | Sarshar | |
| 9,817,897 B1 | 11/2017 | Wang | |
| 9,818,406 B1 | 11/2017 | Chan | |
| 9,846,885 B1 | 12/2017 | Sarshar | |
| 9,947,028 B1* | 4/2018 | Podgorny | G06Q 30/0269 |
| 11,068,942 B2* | 7/2021 | Briancon | G06N 3/0445 |
| 11,436,642 B1* | 9/2022 | Podgorny | G06F 16/3329 |
| 11,516,537 B2* | 11/2022 | Van Os | G10L 15/1815 |
| 2011/0022502 A1 | 1/2011 | Evans | |
| 2015/0178853 A1 | 6/2015 | Byron | |
| 2015/0186514 A1* | 7/2015 | Singh | G06F 16/951 |
| | | | 707/706 |
| 2015/0186515 A1* | 7/2015 | Rao | G06F 16/951 |
| | | | 707/610 |
| 2021/0390127 A1* | 12/2021 | Fox | G06F 40/289 |

OTHER PUBLICATIONS

Kafle et al. "An Analysis of Visual Question Answering Algorithms" 2017 IEEE International Conference on Computer Vision (ICCV) Year: 2017, pp. 1983-1991.

Jang et al., "TGIF-QA: Toward Spatio-Temporal Reasoning in Visual Question Answering" 2017 IEEE Conference on Computer Vision and Pattern Recognition (CVPR) Year: 2017, pp. 1359-1367.

Cheng et al., "A Multi-Objective Optimization Approach for Question Routing in Community Question Answering Services" IEEE Transactions on Knowledge and Data Engineering Year: 2017, vol. 29, Issue: 9, pp. 1779-1792.

Liu et al., "Answer Quality Prediction Joint Textual and Non-Textual Features" 2016 13th Web Information Systems and Applications Conference (WISA) Year: 2016, pp. 144-148.

Nyberg et al., "The Javelin Question-Answering System at TREC 2002", NIST Special Publication: SP 500-251, The Eleventh Text Retrieval Conference (TREC 2002), Nov. 21, 2002, pp. 1-10.

Hazen et al., "Recognition Confidence Scoring and Its Use in Speech Understanding Systems", Computer Speech and Language, vol. 16, 2002, pp. 29-67.

Liu et al., "Predicting Information Seeker Satisfaction in Community Question Answering", SIGIR '08 Proceedings of the 31st annual international ACM, SIGIR conference on Research and development in information Retrieval, 2008, pp. 483-490.

Lee et al., "Model for Voter Scoring and Best Answer Selection in Community Q&A Services", 2009 IEEE/WIC/ACM International Conference on Web Intelligence, 2009, pp. 116-123.

Wikipage Logistic Regression, http://en.wikipedia.org/wiki/Logistic regression, printed Apr. 15, 2014, 18 pgs.

H&R Block webpage, http://www.hrblock.com/get-answers/tax-questions-answers.html, printed Apr. 15, 2014. 6 pgs.

AnswerXchange Webpage, https://ttic.intuitcom/tags/health°/020exchange, printed Apr. 15, 2014, 9 pgs.

Wikipage Random Forest, http://en.wikipedia.org/wiki/Random_forest, printed Apr. 15, 2014, 6 pgs.

* cited by examiner

SYSTEM AND METHOD FOR MANAGING SOCIAL-BASED QUESTIONS AND ANSWERS

CROSS REFERENCE TO RELATED APPLICATIONS

This application is a U.S. Continuation of U.S. application Ser. No. 14/216,675 filed Mar. 17, 2014. The entirety of all the above-listed applications are incorporated herein by reference.

SUMMARY

In one embodiment, a computer-implemented method of managing questions and answers on a computer-hosted service includes a computing device configured to receive text based tax question and answer pairings, the computing device inputting the text based tax question and answer pairings into a content model executed by the computing device. The computing device outputs a content score for each tax question and answer paring based on the model, the content score is a number within a range, wherein one end of the range corresponds to product content and another end of the range corresponds to general tax content. The computing device may then separate the question and answer pairings into product tax question and answer pairings and general tax question and answer pairings based on respective content scores.

In another embodiment, a computer-implemented method of managing questions and answers on a computer-hosted service includes a computing device receiving text based tax question and answer pairings, the computing device inputting the text based tax question and answer pairings into a content model executed by the computing device. The computing device outputs a content score for each tax question and answer pairing based on the model, the content score is a number within a range, wherein one end of the range corresponds to product content and another end of the range corresponds to general tax content. The computing device outputs an answer quality score for the text based tax question and answer pairings based at least in part on the content score and votes assigned to each respective question and answer pairing, wherein votes are up votes and down votes. The computing device generates a FAQ list stored in a database based at least in part on the answer quality score.

In another embodiment, a system for managing questions and answers on a computer-hosted service includes a computing device configured to receive text based tax question and answer pairings. The computing device inputs the text based tax question and answer pairings into a content model executed by the computing device. The computing device outputs a content score for each tax question and answer pairing based on the model, the content score is a number within a range, wherein one end of the range corresponds to product content and another end of the range corresponds to general tax content. The computing device outputs an answer quality score for the text based tax question and answer pairings based at least in part on the content score and votes assigned to each respective question and answer pairing, wherein votes are up votes and down votes. The computing device generates a FAQ list stored in a database based at least in part on the answer quality score.

DETAILED DESCRIPTION OF ILLUSTRATED EMBODIMENTS

Figure 1:
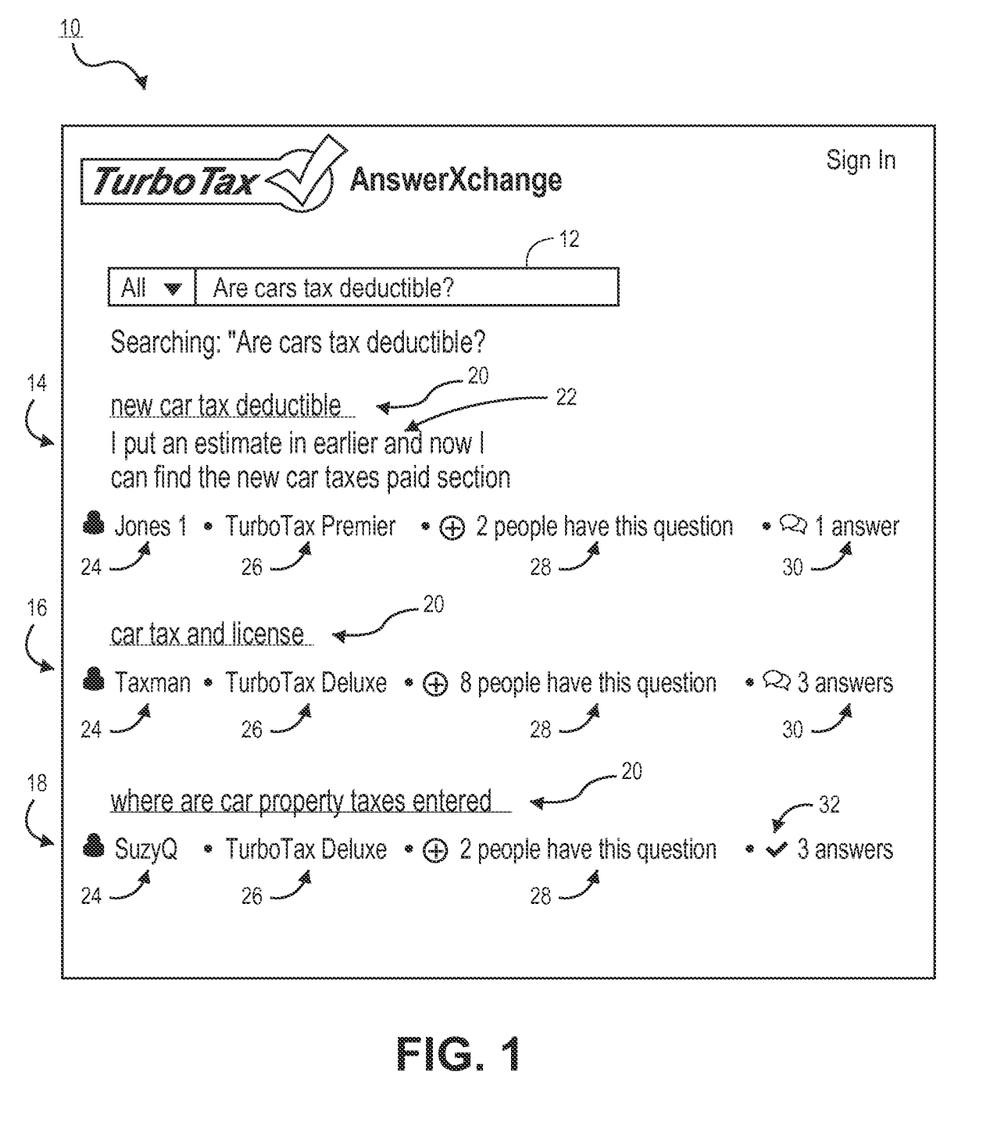
FIG. 1 illustrates a screen shot of a social question and answer (Q&A) website where users share their collective knowledge on a particular topic of interest.

FIG. 1 illustrates a screen shot of a social question and answer (Q&A) website 10 where users share their collective knowledge on a particular topic of interest. FIG. 1 illustrates an example of the TurboTax AnswerXchange (http://turbotax.intuit.com) where both customers and non-customers share questions and answers regarding tax topics. In this particular example, the tax questions and answers may be broadly viewed as tax topics that relate to general tax topics, tax topics that relate to products or services (i.e., TurboTax products or services), or tax topics that are mixed with both general tax and product components.

The users of the TurboTax AnswerXchange differ widely by their degree of domain expertise. For some users, their interaction with the TurboTax AnswerXchange occurs while they are working on software that is utilized to prepare their tax returns. Such software may be used as standalone software or application running on a personal computer, laptop, tablet, mobile device, Smartphone. Alternatively, the software may be used as an online service that user's interface with using, for example, a browser application. As a user steps through various TurboTax interview or other prompt screens, the user can ask a question or view and search contextually relevant content. Users may also contribute to AnswerXchange by commenting on questions and answers, voting answers up or down, and leaving feedback. In the AnswerXchange, a large number of answers to questions originate from non-compensated "super users" that are selected by moderators based on answer frequency and quality of contributions.

Figure 3:
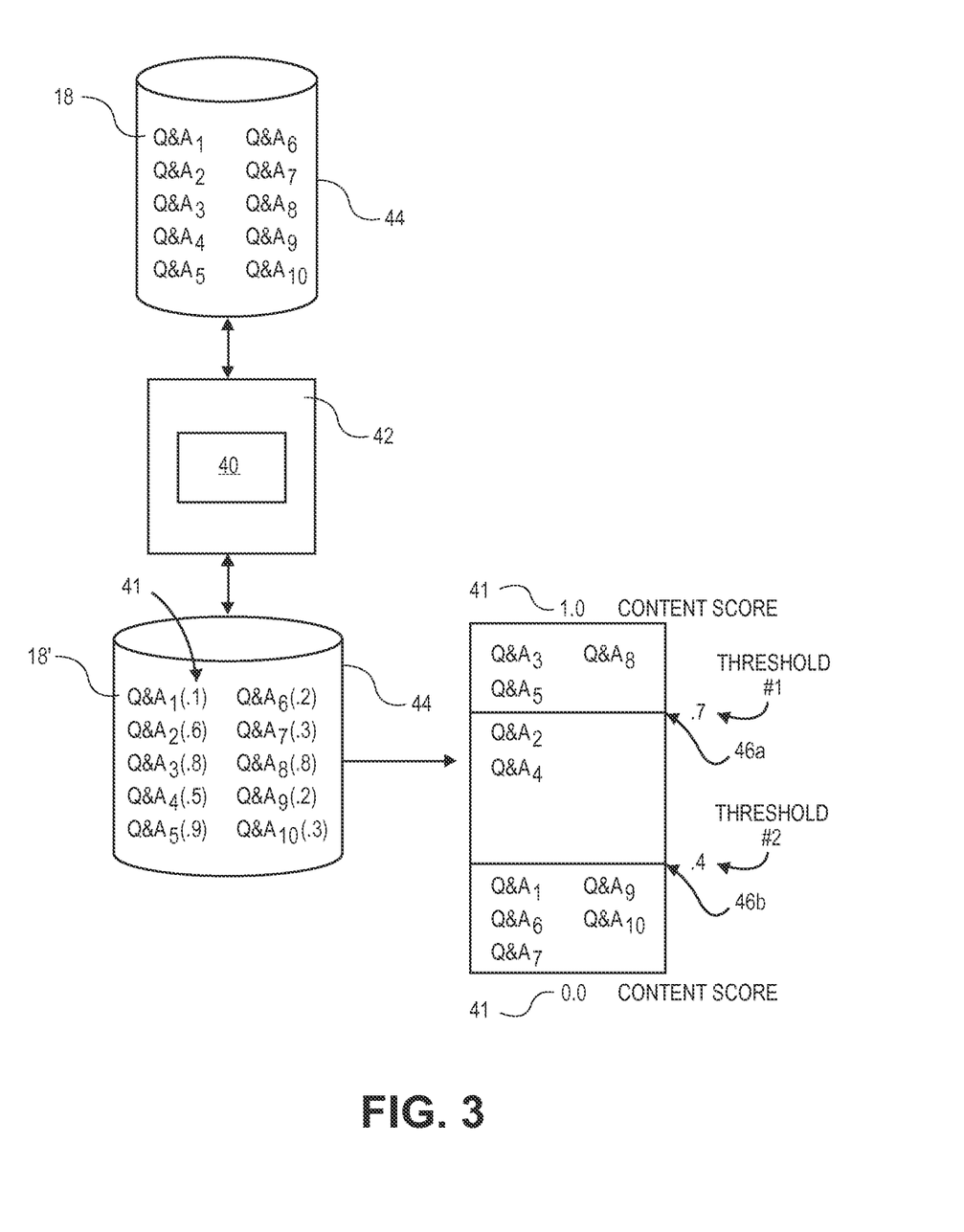
FIG. 3 illustrates Q&A pairings that are run through a content model.

FIG. 1 illustrates an illustrative web page of the TurboTax AnswerXchange website 10. The website 10 includes a query box 12 where users can input questions. In this example, the question "Are cars tax deductible?" has been input into the query box 12 bringing up several paired questions and answers 14, 16, 18 that are presented to the user. The paired question and answers 14, 16, 18 may be stored in a database 44 as seen in FIG. 3. In this particular view of FIG. 1, only portions of the question are visible and not the paired answer(s). In other embodiments, however, portions or all of the answer may also be visible. Each paired question and answer may include a brief subject heading 20 pertaining to the question as well as more detailed text 22 for the question. Below each paired question and answer 14, 16, 18 is presented a user name 24 for the individual that posed the question, the product information 26 related to the type of product used by the question submitter, the number of users having this question 28, and the number of answers 30 for this question. Thus, while reference is made to question and answer pairings, a single question may be paired with one or more answers. It is not necessary that a single question have a single answer although in some cases, there will be only a single answer. In some instances, the results may indicate the presence of a recommended answer 32 amongst the total answers submitted to this question.

Figure 2:
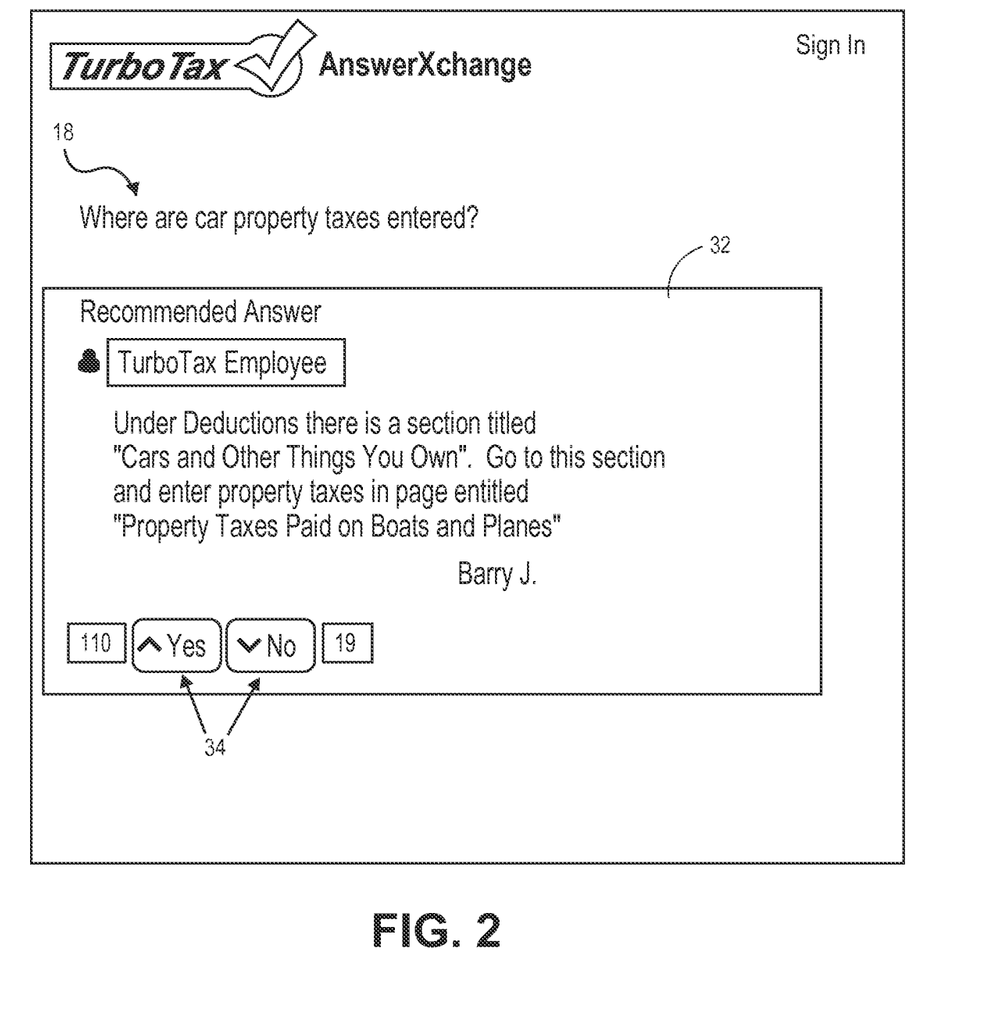
FIG. 2 illustrates a screen result after a user has clicked the hyperlink that corresponds to the question and answering pairing illustrated in FIG. 1 ("where are car property taxes entered").

FIG. 2 illustrates a screen result after a user has clicked the hyperlink that corresponds to the question and answering pairing 18 ("where are car property taxes entered"). In this view, the full recommended answer 32 is displayed for review by the user. In this particular embodiment, the recommended answer was supplied by a TurboTax Employee but it recommended answers may originate from others within the online community. The recommended answer 32 includes a detailed response to the question that was posed. The recommended answer 32 (like all answers) also includes vote buttons 34 or the like that are used to rate the particular answer that is provided. A user asking the question or a user browsing the Q&A database may vote on any particular answer. In this example, one hundred ten users have identified this answer as helpful. Nineteen users have identified this answer as not helpful.

One of the goals of AnswerXchange is to prevent users from asking duplicate questions. Once way to do this is to display contextually relevant content on the particular TurboTax interview screens and promoting search. The AnswerXchange content needs to be therefore moderated to improve the relevancy and quality of answers that are shown to users. In one aspect, the moderation system relies on a reputation-based system to distinguish trustworthy contributors from untrustworthy contributors and rank the answers they provide using quality metrics. In one aspect of the invention, question and answer pairings are run through a content model 40 that is executed by a computer 42 as illustrated in FIG. 3 to output a content score 41 for each tax question and answer pairing based on the model, the content score 41 comprising a number within a range, wherein one end of the range corresponds to product content and another end of the range corresponds to general tax content.

Question and answer pairings that include product content are those parings that are, for example, TurboTax specific. The question and answer pairings may include text therein that refers a TurboTax or a specific product, e.g., Turbo-Tax—Home and Business. Product specific questions can also be those Q&A pairings that deal with pricing, installation issues, e-filing, and the like. In contrast, question and answer pairings that relate to general tax issues (e.g., "what is a tax credit") contain general tax content. For example, tax questions that are semantically similar to publications issued by the Internal Revenue Service or other taxing authorities may fall into the latter category. Some Q&A pairings, however, do not fall cleanly within one category or the other and may contain both general tax content and product content. As explained below, the content model 40 is able output a content score 41 for each tax question and answer pairing. The content score 41 is a number within a range, wherein one end of the range corresponds to product content and another end of the range corresponds to general tax content.

In one particular embodiment, the content score 41 ranges from 0.0 to 1.0. The 0.0 lower bound corresponds to Q&A pairing that purely relates to general tax subject matter (e.g., "what is the AMT (Alternative Minimum Tax)"). Conversely, the 1.0 upper bound corresponds to a Q&A pairing that purely relates to a product (e.g., "Where do I enter my W-2 into TurboTax"). FIG. 3 illustrates operation of the content model 40 according to one embodiment. In this embodiment, question and answer pairings 18 (Q&A$_1$, Q&A$_2$, Q&A$_3$, Q&A$_4$, Q&A$_5$, Q&A$_6$, Q&A$_7$, Q&A$_8$, Q&A$_9$, Q&A$_{10}$) are input into the content model 40 for content scoring. For example, the question and answer pairings 18 may be contained in a repository such as a database 44. The text of the question and answer pairings 18 is run through the content model 40 to assign a content score 41 to each answer pairing 18.

FIG. 3 illustrates scored question and answer pairings 18' after being run through the content model 40. As seen in FIG. 3, each question and answer pairings 18 has been scored, resulting in corresponding scored question and answer pairings 18'. FIG. 3 also illustrates two thresholds 46a, 46b that are established by the computer 42 to bin or sort the scored question and answer pairings 18'. In this particular example, a first threshold 46a is set at 0.7 and second threshold 46b is set at 0.4. In this example, a score of 0.7 or higher reflects that the question and answer pairings 18' correspond to product related Q&As. A score of 0.4 or less reflects that the question and answer pairings 18' correspond to general tax Q&As. For scores between 0.4 and 0.7, these Q&A pairings 18' are mixed in that they contain both general tax and product components.

To generate the content model 40, a labeled dataset can be used to generate a predictive content model 40. For example, a dataset was obtained from about 60,000 classifications obtained from trusted users of the AnswerXchange website. An option to classify a question as tax or product related was part of a question and answering process and classifications were recorded immediately after a user read the question and submitted the first answer. This process generates a known dataset that can then use machine learning algorithms using term frequencies as model attributes. For example, Random Forest, Gradient Boosted Decision Trees, logistic regression, or Neural Network techniques using term frequencies as model attributes can be used to develop the content model 40.

In one example of a content model 40, a logistic regression content model 40 was created to classify question and answer pairings 18. In this example, the text contained in the subject field, detail field, and first answer field are extracted. The subject field corresponds to a short text field (e.g., 255 characters) that includes a brief description of the question being posed. The detail field corresponds to a longer, free-form text field that contains more content about the particular question being asked. The detail field may be omitted or blank in some embodiments. The answer field corresponds to the text of the answer provided by a human. In some instances, the text of the answer corresponds to the first answer provided by a human (i.e., first answer). Based on the extracted text, coefficient values are extracted for certain words or word formatives that are identified. The content score 41 may by then be obtained by summing the values of the extracted coefficients. The content score 41 may optionally be normalized such that it falls within a range of 0.0 and 1.0 as explained herein.

Below is exemplary code from a content model 40 that is used to generate a content score 41. The code may be implemented in any number of languages including, for example, Ruby on Rails.

Content Model Coding
attr_reader:score
    def initialize(subject, details="", first_answer="")
    text=[subject, details, first_answer].join(' ')
    score=self.class.intercept+
      self.class.model_coefficients[:subject]+
      self.class.model_coefficients[:details]+
      self.class.model_coefficients[:first_answer]
    self.class.model_terms.each do|key, value|
      score+=value if text=~/#{key}/i
    end
    @score=1.0/(1+Math.exp(−score)) [used to optionally normalize score]
    end
    def self.compute_score(*args)
    self.new(*args).score
    end
    private
    def self.intercept
    0.26051822844497
    end
    def self.model_coefficients [optional if length of text in field is used; length multiplied by coefficient]
    {
      subject: −0.000391912470504203,
      details: −8.53171041665722e−05,
      first_answer: −5.83899245058231e−05
    }
    end
    def self.model_terms
    {
      'account'=>0.0509182084382942,
      'amount'=>−0.0604850396785795,
      'basic'=>0.0631927867380612,
      'box'=>−0.068037377215892,
      'card'=>0.235661042386693,
      'chang'=>0.0310418191815757,
      'child'=>−0.0301690794563996,
      'claim'=>−0.0919391252946624,
      'click'=>0.213795347080862,
      'credit'=>−0.0352035524852288,
      'deduct'=>−0.0672484164643659,
      'delet'=>0.194522018624086,
      'delux'=>0.137222459567975,
      'dependent'=>−0.0589323457566189,
      'efil'=>0.0587946515891239,
      'enter'=>0.0259185908738863,
      'expens'=>−0.0719291385947926,
      'feder'=>0.0578313061139558,
      'file'=>0.0408632577487507,
      'follow'=>−0.0539361351043247,
      'free'=>0.13410719832657,
      'home'=>−0.0474584936150926,
      'incom'=>−0.057972521973015,
      'info'=>0.0329214812412327,
      'interest'=>−0.0613567647206696,
      'irs'=>−0.0833755220393116,
      'live'=>−0.0550906684329309,
      'mail'=>0.0611783365072029,
      'print'=>0.107480442049151,
      'propert'=>−0.0494466375234983,
      'qualifi'=>−0.0481827665680173,
      'receiv'=>−0.041869322598912,
      'report'=>−0.0676699458602442,
      'screen'=>0.116959605132099,
      'search'=>−0.236166177038077,
      'section'=>0.0369875230979452,
      'select'=>0.0697256602272577,
      'turbo'=>0.208897386698076,
      'version'=>0.232743335386157,
      'year'=>−0.0325947754079307
    }
    end
end Note that in this example, the presence of the words or word portions in any of the fields results in the corresponding coefficient to be extracted and used in the summation formula. The coefficients are added to the intercept value as part of the logistical regression model. If a particular word or word portion is not found in any of the fields, the attribute is set to 0 (i.e., attribute is either 1 if present or 0 if not present). While the above-noted content model 40 is one example that is disclosed it should be understood that other variations may be contemplated. For example, the length of characters used in the above-noted fields may be incorporated into a content model 40 to provide additional precision (e.g., length of characters may be used in a Random Forest model).

Example 1 (Content Score)

Below is an example of a content score 41 generated from the content model 40 for the following question and answer pairing:

Subject: Am I eligible for a standard deduction?
Detail: N/A
Answer: Yes, you are allowed a certain amount, depending on your filing status, to deduct from your income before it is taxed.
Algorithm 1: TaxProductClassifier
Checking for "true" attributes using regular expressions:
amount: true; assign attribute value=1
deduct: true; assign attribute value=1
incom: true; assign attribute value=1
The remaining boolean attributes are false; assign attribute value=0.

$$\text{score} = 0.26051822844497 - 0.0604850396785795 - 0.0672484164643659 - 0.057972521973015 = 0.07481225$$

After normalization:

$$\text{Normalized score} = 1.0/(1+\exp(-\text{score})) = 1.0/(1+\exp(-0.07481225)) = 0.5186943$$

This normalized score falls within the second lowest decile of ten deciles. Based on score (as segmented into deciles), this is a general tax question.

Figure 4A:
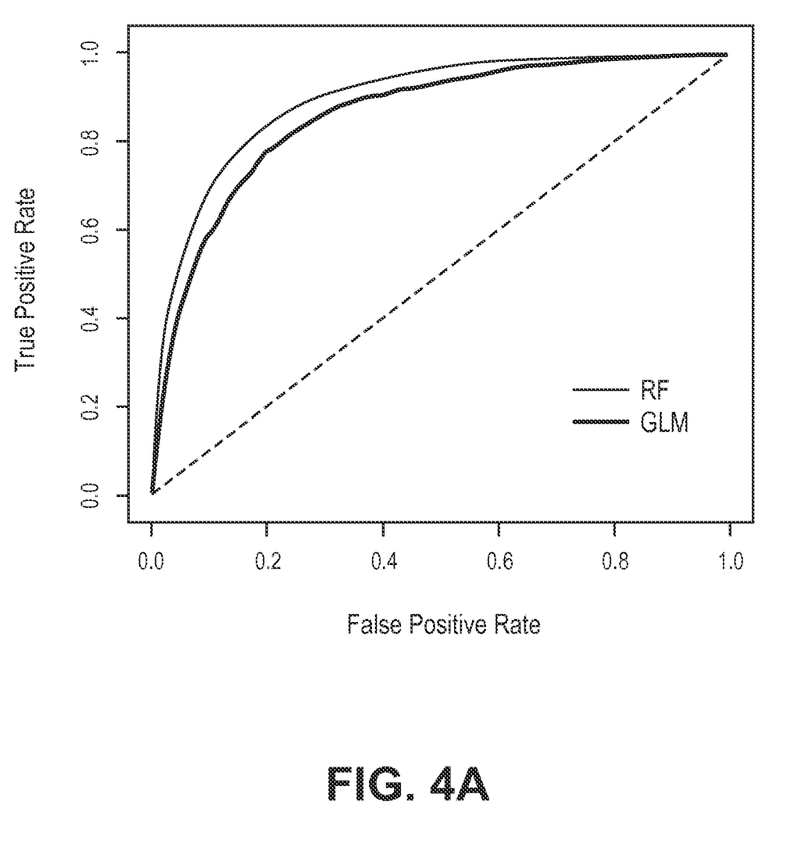
FIG. 4A illustrates the receiver operating characteristic (ROC) curve for the AnswerXchange content model 40 built with a Random Forest (RF) and logistic regression (GLM) model.

FIG. 4A illustrates the receiver operating characteristic (ROC) curve for the AnswerXchange content model 40 built with a Random Forest (RF) and logistic regression (GLM) model. The content model 40 may be run on a number of platforms. For example, Ruby on Rails may be used to program and implement the content model 40. The content model 40 may also be implemented as a SQL script to be used in the relational databases.

Figure 4B:
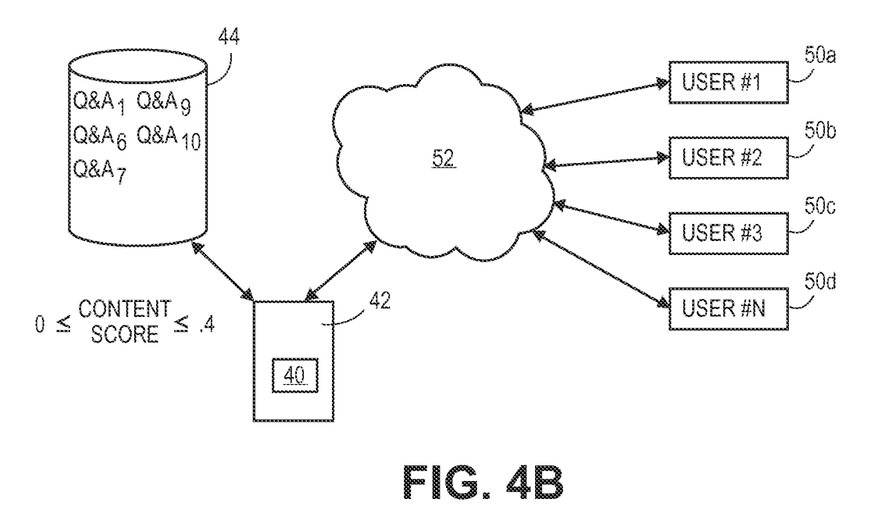
FIG. 4B illustrates a subset of scored Q&A pairings having a content score within a particular range (or exceed or fall below a threshold) that are shared with a group of users.

In one aspect of the invention, the computer 42 may separate the text based tax question and answer pairings into product tax question and answer pairings and general tax question and answer pairings based on respective content scores. This was illustrated, for example, in FIG. 3 where two separate thresholds 46a, 46b were established to separate the question and answer pairings 18' by content score. In one aspect of the invention, as illustrated in FIG. 4B, a subset of the Q&A pairings 18' having a content score within a particular range (or exceed or fall below a threshold) are shared with a group of users 50a, 50b, 50c, 50d. The users 50a, 50b, 50c, 50d access to this subgroup of Q&A pairings 18' is controlled via computer 42. The users may access this subgroup of Q&A pairings 18' via a network 52 such as the Internet using a typical browser interface, application, or the like. In this particular example, the subset of Q&A pairings 18' that are accessible to users 50a, 50b, 50c, 50d are those that relate more to general tax topics (given their content score within the range between 0.0 and 0.4). For example, this subset of Q&A pairings 18' includes general tax questions and answers as opposed to product tax questions and answers. Access to the subset of Q&A pairings 18' may be granted to those users that are only interested in general tax topics. For example, the subset of Q&A pairings 18' may be sold or licensed to other entities that have a need for access to frequently asked questions and answers that relate to general tax issues as opposed to product specific questions and answers.

Figure 4C:
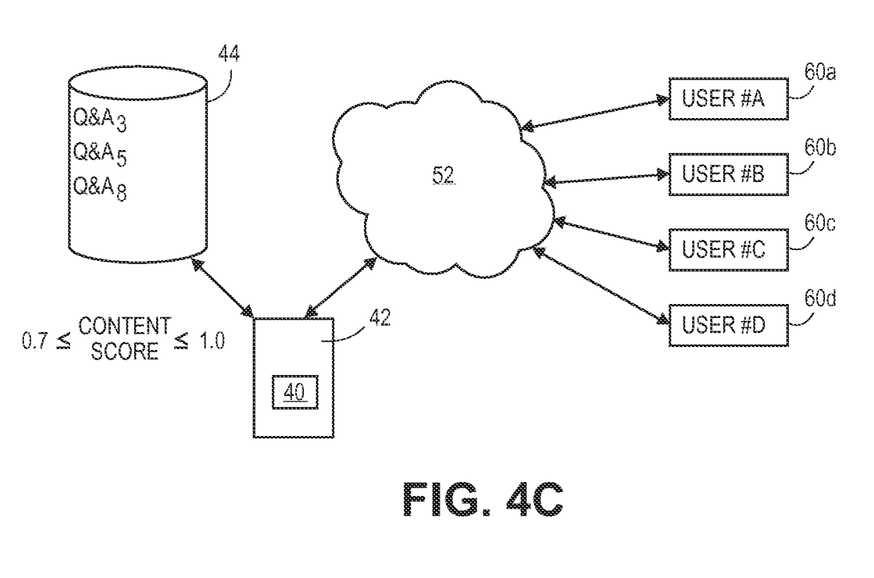
FIG. 4C illustrates another subset of scored Q&A pairings having a content score within a particular range (or exceed or fall below a threshold) that are shared with a group of users.

Conversely, FIG. 4C illustrates an embodiment of the invention, wherein a subset of the Q&A pairings 18' having a content score within a particular range (or exceed or fall below a threshold) are shared with a group of users 60a, 60b, 60c, 60d. The users 60a, 60b, 60c, 60d access to this subgroup of Q&A pairings 18' is controlled via computer 42. The users may access this subgroup of Q&A pairings 18' via a network 52 such as the Internet using a typical browser interface, application, or the like. In this particular example, the subset of Q&A pairings 18' that are accessible to users 60a, 60b, 60c, 60d are those that relate to product specific tax issues (given their content score within the range between 0.7 and 1.0).

In another aspect of the invention, further product-specific, sub-groups of the Q&A pairings 18' may be selectively accessible to users 60a, 60b, 60c, 60d. For example, a particular Q&A pairing 18' may have particular relevance to a user of a TurboTax product with more functionality (e.g., TurboTax Home and Business). This same Q&A pairing 18' might not be particularly relevant to a user of a TurboTax product with less functionality (e.g., TurboTax Basic). In this particular example, the Q&A pairing 18' would be accessible or shown to those users 60a, 60b, 60c, 60d who have TurboTax Home and Business. This may be accomplished through content score 41 alone. The particular product used by a user 60a, 60b, 60c, 60d is determined when a user authenticates on the website and obtains a user ID and password. This is, of course, is only one illustrative example of further refinement of how sub-groups of Q&A pairings 18' may be selectively accessible to users 60a, 60b, 60c, 60d. Other sub-groups based on product type or SKU is also possible.

In another aspect of the invention, an answer quality model 70 is used predict or determine the quality of any given answer to a question. The answer quality model 70 can be applied to AnswerXchange answers to identify the best answers and improve the relevancy of AnswerXchange search results by boosting the quality content. In addition, the answer quality model 70 is based, at least in part, on the aforementioned content scores 41 produced by the content model 40 such that tax-related answers can be shared across different TurboTax product versions (e.g., different SKUs) while product-specific answers can be restricted to predefined user sub-groups as explained herein. Finally, the answer quality model 70 may also be used to generate FAQ collections related to general tax questions and answers. Such a FAQ collection could be shared, licensed or sold to third parties in need of such information (e.g., taxing authorities).

The answer quality model 70 may be applied to question and answer pairings 18' that have received votes from users or question and answer pairings 18' that have not yet received any votes. In this last instance, the answer quality model 70 can effectively be used to predict user votes for a particular question and answer pairing 18'.

Figure 5:
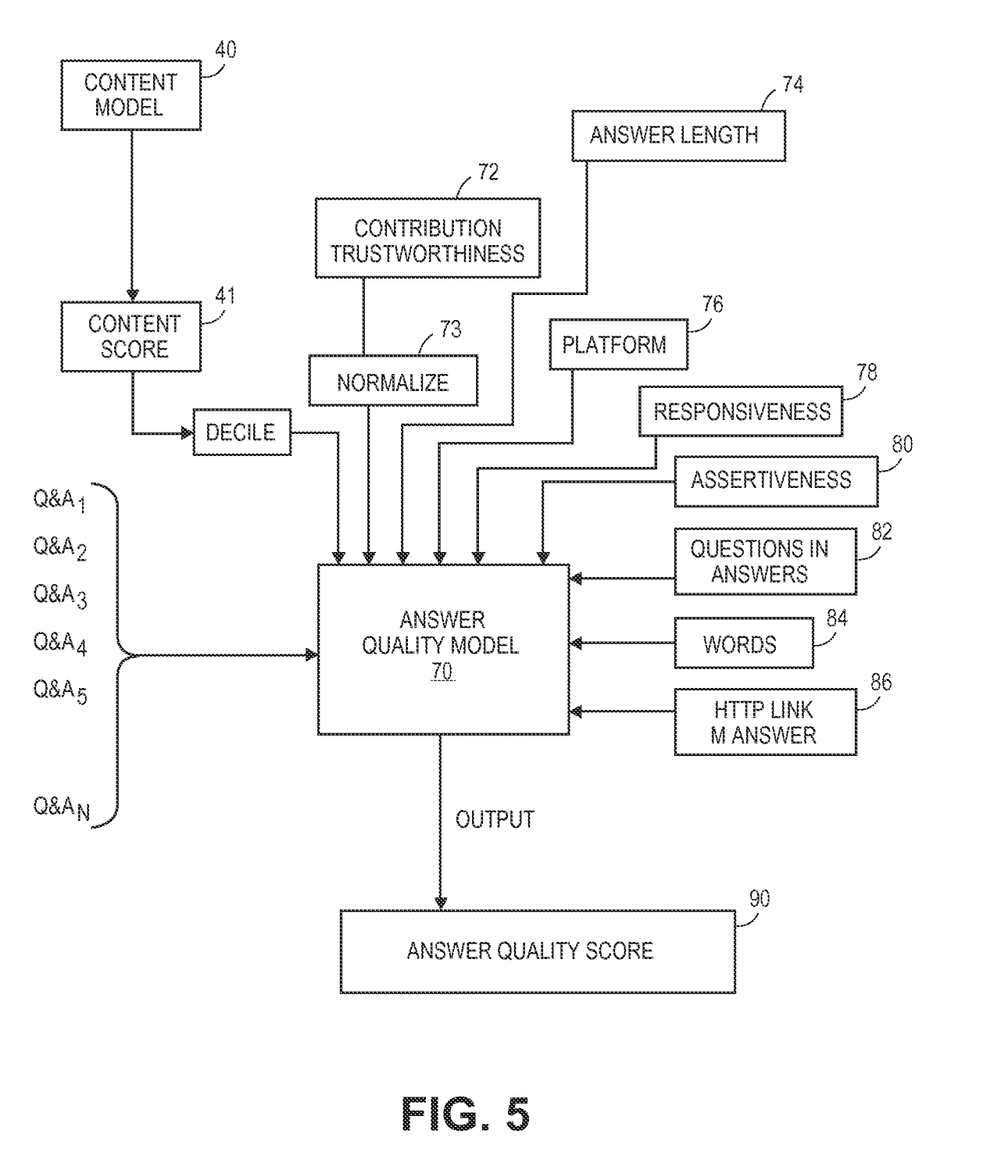
FIG. 5 illustrates an answer quality model according to one embodiment.

FIG. 5 illustrates an answer quality model 70 according to one embodiment. In this embodiment, the answer quality model 70 is input with a number of attributes. In the example of FIG. 5, the content score 41 produced by the content model 40 is used as an input to the answer quality model 70. More specifically, the decile of the content score 41 (e.g., 1-10) is used as an input to the answer quality model 70. The decile of the content score 41 is akin to segmenting the content scores into 10 segments. Next, the answer quality model 70 uses indicia of a particular answer contributor's qualification or trustworthiness 72. In this regard, a contributor's down fraction of votes are used. The down fraction of votes is computed by tallying the total number of down votes divided by the total number of votes given to a particular contributor. Optionally, this number may be normalized as seen in normalization operation 73 to remove content type bias from down vote statistics. For example, it has been found that answers to product related questions from each user group receive a larger fraction of down votes. Equation 1 below can be used to normalize all down votes received from question askers:

$$w(\text{score}) = \frac{\bar{f}(1.0 - f(\text{score}))}{f(\text{score})(1.0 - \bar{f})} \qquad \text{Eq. 1}$$

where $\bar{f}$ is the average fraction of down votes computed for all askers' votes. The rationale for normalization is to remove content type bias from the down vote statistics and equalize trusted user answer quality metrics by score deciles. The length of the answer 74 is also used as an attribute as part of the answer quality model 70. Specifically, in this embodiment, the log of the character length of the answer 74 is determined. Generally, longer answers tend to get better responses up to a certain length. The user-optimal length is around three sentences. Another attribute that is used in this particular answer quality model 70 is the platform 76, which is a binary attribute. The value is set to 1 when the platform is TurboTax online. Conversely the value is set to 0 when the platform is an offline version of TurboTax. Finally, in this embodiment, answer responsiveness 78 is optionally used as an attribute to the answer quality model 70. This attribute is also binary in that it is set to 1 if the answer is submitted within a day and is set to 0 if the answer arrives more than one day after posting the question. It should be understood, however, that the responsiveness attribute 78 is optional.

Additional attributes that can be used as part of the answer quality model 70 include assertiveness 80. The assertiveness attribute 80 relates to whether indicia of confidence are present in the answer to a particular question. For example, use of the words "Yes" or "No" are examples of assertiveness attributes. Answers that start with "Yes" or "No" are less likely to be voted down. Another attribute can include the use of questions 82 in the answer. Use of the words "why," "what," "where," "how," "do," "are," "can" in the answer can be indicative of such question attributes 82. The use of certain emotive or expressions of gratitude 84 with words such as "thank* (* indicates it includes thank or thanks), "sorry," and "please" may also be attributes input into the answer quality model 70. Finally, the use of a web link (e.g., http link) 86 in an answer may be input into the answer quality model 70.

An example of code used as part of the answer quality model 70 is included below. The code may be implemented in any number of languages including, for example, Ruby on Rails. For example, AnswerXchange is written on Ruby on Rails.

```
Answer Quality Model Coding
attr_reader:quality_score
  def initialize(reply_id)
  reply=Reply.find_by_id(reply_id)
  text=downcase(reply.body)
  answer_length_log=Math.log(text.length)
  post=reply.post
  platform=post.contextual_id??1:0
  responsiveness=(reply.created_at-post.created_
      at).to_i<86_400?1:0
  product_score=post.product_score
  user=reply.user
  quality_score=self.class.intercept+
    self.class.model_coefficients[:decile]*product_score.
        decile+
    self.class.model_coefficients[:down_fraction]*user.
        down_fraction+
    self.class.model_coefficients[:answer_length_log]*an-
        swer_length_log+
    self.class.model_coefficients[:platform]*platform+
    self.class.model_coefficients[:reponsiveness]*repon-
        siveness
  self.class.model_terms.each do|key, value|
    quality_score+=value if text=~key
  end
  @quality_score=1.0/(1.0+Math.exp(-quality_score))
  end
  def self.compute_quality_score(*args)
  self.new(*args).quality_score
  end
  private
  def self.intercept
  -1.165299
  end
  def self.model_coefficients
  {
    decile: 0.146106,
    down_fraction: 0.051924,
    answer_length_log: -0.781401,
    platform: -0.296897,
    reponsiveness: -0.345864
  }
  end
  def self.model_terms
  {
    Regexp.new('^(yes|no)')=>-1.302434,
    Regexp.new('^(why|what|where|how|do|are|
        can)')=>0.591695,
    Regexp.new('(thank|sorry|please)')=>0.535893,
    Regexp.new('http')=>0.580651
  }
  end
end
```

The answer quality model 70 outputs an answer quality score 90 that is indicative of the answer quality. In one aspect, the answer quality score 90 ranges from 0.0 to 1.0 but it does not necessarily have to be bound by those numbers. The importance is the relative ranking of the answer quality between answers. As noted above, however, the answer quality score 90 may be normalized between 0.0 and 1.0 in some embodiments.

Example 2 (Answer Quality Score)

Below is an example of an answer quality score 90 generated from the answer quality model 70 for the following question and answer pairing:
Subject: Am I eligible for a standard deduction?
Detail: N/A
Answer: Yes, you are allowed a certain amount, depending on your filing status, to deduct from your income before it is taxed.
Algorithm 2: AskerVoteClassifier
Using the same answer as in Example 1.
Checking for numeric attributes:
decile=2
down_fraction=12.3
answer_length_log=4.795791
platform=1
reponsiveness=1
Checking for true attributes using regular expressions:
Regexp.new('^(yes|no)')=true; assign attribute value=1
The remaining boolean attributes are false; assign attribute value=0.

$$\text{quality\_score} = -1.165299 + 0.146106*2 + 0.051924*12.3 - 0.781401*4.795791 - 0.296897*1 - 0.345864*1 - 1.302434 = -5.927053$$

After normalization:

$$\text{Normalized quality\_score} = 1.0/(1.0 + \exp(-\text{quality\_score})) = 1.0/(1.0 + \exp(5.927053)) = 0.002659238$$

Based on the relatively low numerical score, this a good quality answer.

Figure 6:
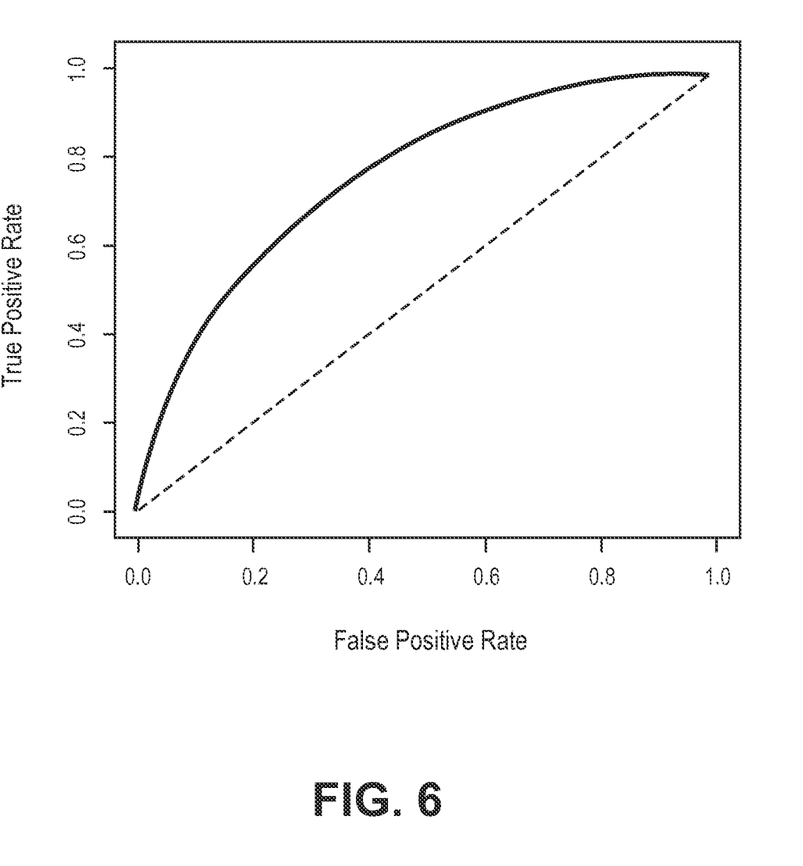
FIG. 6 illustrates a receiver operating characteristic (ROC) curve for an answer quality model.

FIG. 6 illustrates a receiver operating characteristic (ROC) curve for an answer quality model 70. The model operates with a logistic regression, although the answer quality model 70 may also be built using Random Forest, Gradient Boosted Decision Trees, or Neural Network techniques using term frequencies and other attributes.

Figure 7:
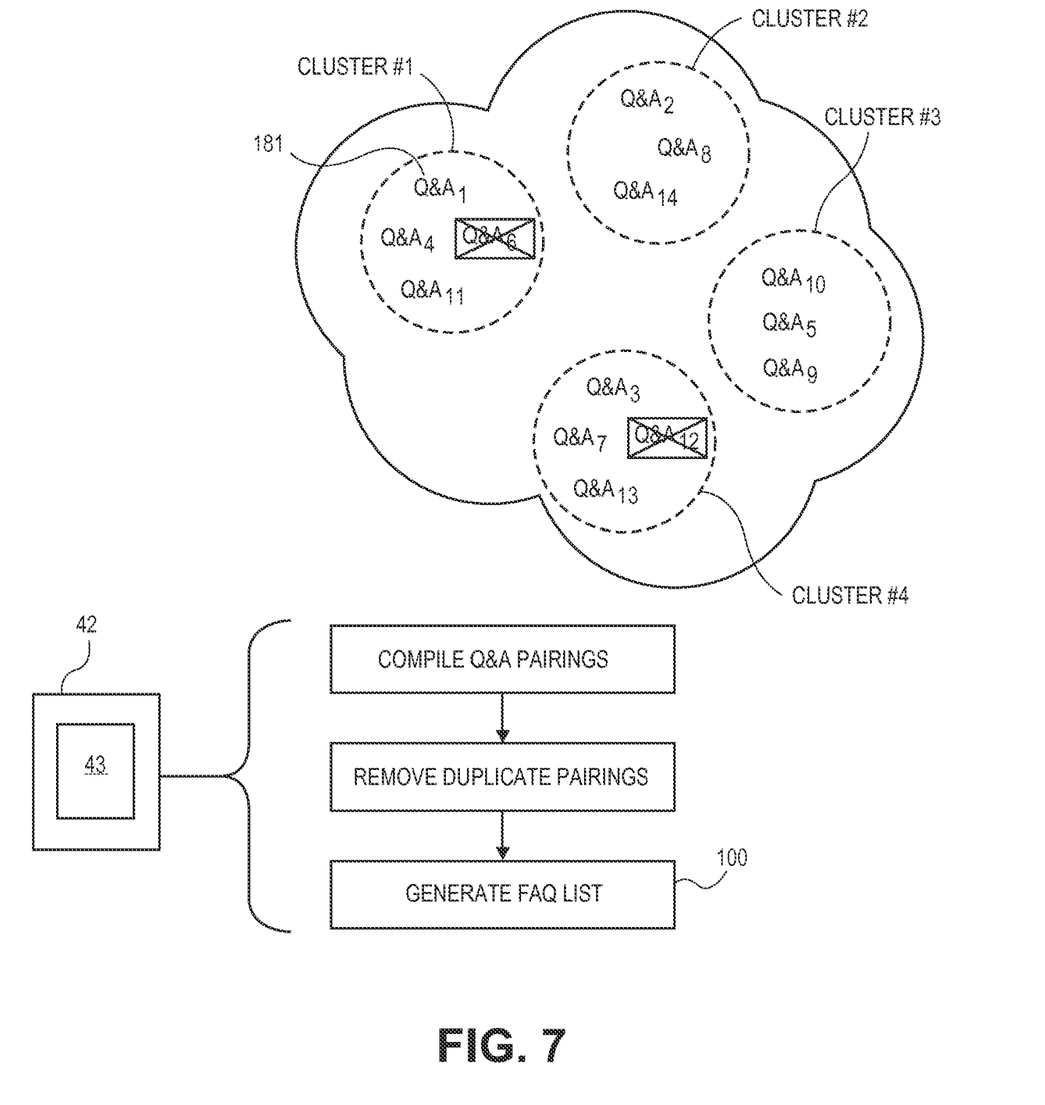
FIG. 7 illustrates another embodiment of the invention, in which the Q&A pairings are then used to generate a FAQ list.

FIG. 7 illustrates another embodiment of the invention, in which the Q&A pairings 18' are then used to generate a FAQ list 100. In this embodiment, the computer 42 contains software 43 that compiles Q&A pairings 18' and removes duplicated Q&A pairings 18' prior to generation of the FAQ list 100. The removal of duplicated Q&A pairings 18' may be accomplished by first generating clusters of Q&A pairings 18' with each cluster pertaining to a particular topic or sub-topic. The Q&A pairings 18' within each cluster are then examined for substantial duplicates using the software 43 run on the computer 42. The substantial duplicates may be measured by measuring, for example, the Jaccard similarity between Q&A pairings 18' within a cluster. The Jaccard similarity coefficient, for example, is a statistic that can be used to measure the similar of a sample set. A threshold of the Jaccard similarity coefficient can be used as a cut-off such that Q&A pairs 18' below (or above) the cut-off are identified as substantial duplicates and discarded or ignored. After substantial duplicates have been eliminated, the FAQ list 100 may be generated. In the example of FIG. 7, Q&A$_6$ pairing 18' from cluster #1 and Q&A$_{12}$ pairing 18' from cluster #4 have been removed as substantial duplicates.

The FAQ list 100 that is generated may be ranked and populated according the content score 41 and/or the answer quality score 90. For example, with respect to content score 41, there may be FAQ lists 100 that are directed to products or even certain product types or SKUs. Alternatively, FAQ lists 100 may be generated that are directed to general tax questions based on content score 41. In the same way, FAQ lists 100 may also be presented according the answer quality score 90. In some embodiments, the FAQ lists 100 may be based on both content score 41 as well as answer quality score 90. Product-based and general FAQ lists 100 may be generated and used for different business purposes. For example, general tax topic FAQ lists 100 may be sold or licensed to third parties such as federal and state taxing authorities for use. Conversely, proprietary or product/service based FAQ lists 100 may be used as part of AnswerXchange with selective creation of FAQ lists 100 tailored to users of specific products and services.

Figure 8:
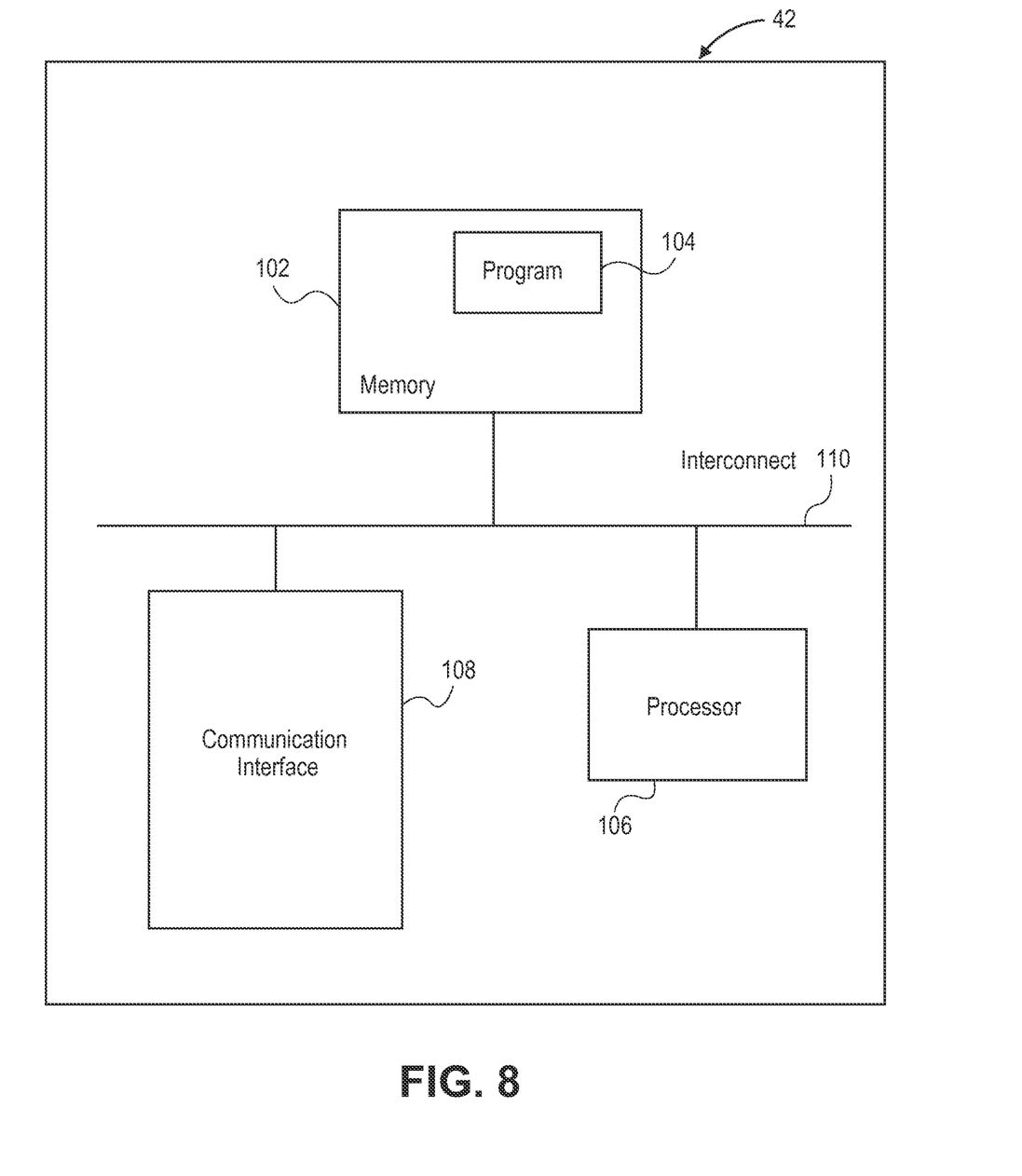
FIG. 8 generally illustrates components of a computing device such as computer or other computing device that may be utilized to execute software for the content model and/or answer quality model.

FIG. 8 generally illustrates components of a computing device such as computer 42 or other computing device that may be utilized to execute software for the content model 40 and/or answer quality model 70 and that includes a memory 102, program instructions 104, a processor or controller 106 to execute program instructions 104, a network or communications interface 108, e.g., for communications with a network or interconnect 60 between such components. The memory 102 may be or include one or more of cache, RAM, ROM, SRAM, DRAM, RDRAM, EEPROM and other types of volatile or non-volatile memory capable of storing data. The processor unit 106 may be or include multiple processors, a single threaded processor, a multi-threaded processor, a multi-core processor, or other type of processor capable of processing data. Depending on the particular system component (e.g., whether the component is a computer or a hand held mobile communications device), the interconnect 110 may include a system bus, LDT, PCI, ISA, or other types of buses, and the communications or network interface may, for example, be an Ethernet interface, a Frame Relay interface, or other interface. The interface 108 may be configured to enable a system component to communicate with other system components across a network which may be a wireless or various other networks. It should be noted that one or more components of computing device may be located remotely and accessed via a network. Accordingly, the system configuration illustrated in FIG. 8 is provided to generally illustrate how embodiments may be configured and implemented.

Method embodiments may also be embodied in, or readable from, a computer-readable medium or carrier, e.g., one or more of the fixed and/or removable data storage data devices and/or data communications devices connected to a computer. Carriers may be, for example, magnetic storage medium, optical storage medium and magneto-optical storage medium. Examples of carriers include, but are not limited to, a floppy diskette, a memory stick or a flash drive, CD-R, CD-RW, CD-ROM, DVD-R, DVD-RW, or other carrier now known or later developed capable of storing data. The processor 106 performs steps or executes program instructions 104 within memory 102 and/or embodied on the carrier to implement method embodiments.

Embodiments, however, are not so limited and implementation of embodiments may vary depending on the platform utilized. Accordingly, embodiments are intended to exemplify alternatives, modifications, and equivalents that may fall within the scope of the claims.

What is claimed is:

1. A computer-implemented method, the computer-implemented method being executed by a computing device executing programmed instructions stored in a memory and comprising:
    the computing device inputting electronic text-based tax question and answer pairings into a content model;
    the computing device executing programmed instructions of the content model and generating respective content scores for each electronic text-based tax question and answer pairing, wherein generating respective content scores further comprises electronically extracting text from each electronic text-based tax question and answer pairing;
    the computing device separating the electronic text-based tax question and answer pairings into product question and answer pairings and general tax question and answer pairings based on the respective content scores generated by execution of the content model;
    inputting one or more attributes into a machine learning answer quality model, wherein at least one of the one or more attributes is the respective content scores and a log of a character length of each answer in the electronic text-based tax question and answer pairings;
    generating, by the machine learning answer quality model, an output including answer quality scores such that each answer in the electronic text-based tax question and answer pairings is assigned an answer quality score;
    the computing device providing access to the product question and answer pairings, based at least on the answer quality scores, to a first group of users through first networks in response to first browser requests from first computing devices of first users of the first group such that the product question and answer pairings are presented through first displays of the first computing devices of the first users; and
    the computing device providing access to the general tax question and answer pairings, based at least on the answer quality scores to a second group of users, different from the first group of users, through second networks in response to second browser requests from second computing devices of second users of the second group such that the general tax question and answer pairings are presented through second displays of second computing devices of the second users.

2. The computer-implemented method of claim 1, wherein each content score comprises a number within a pre-defined range.

3. The computer-implemented method of claim 2, wherein one end of the pre-defined range corresponds to product content and another end of the pre-defined range corresponds to general tax content.

4. The computer-implemented method of claim 1, wherein the computing device separates the electronic text-based tax question and answer pairing based on one or more content score threshold values.

5. The computer-implemented method of claim 4, wherein the computing device further separates product question and answer pairings by a type of tax return preparation software product.

6. The computer-implemented method of claim 1, further comprising the computing device compiling the product question and answer pairings, the compiled product question and answer pairings being presented as frequently asked questions through the first displays of the first computing devices of the first.

7. The computer-implemented method of claim 1, further comprising the computing device compiling the general tax question and answer pairings, wherein the compiled general tax question and answer pairings are presented as frequently asked questions through the second displays of the second computing devices of the second users.

8. The computer-implemented method of claim 1, further comprising the computing device ranking the product question and answer pairings based at least in part on respective content scores generated by execution of the content model and respective votes submitted through one or more interface screens and assigned to respective question and answer pairings, wherein a first user can submit an up vote or a down vote through one or more interface screens.

9. The computer-implemented method of claim 8, wherein the computing device normalizes the down votes.

10. The computer-implemented method of claim 1, further comprising the computing device ranking the general tax question and answer pairings based at least in part on respective content scores generated by execution of the content model and respective votes submitted through one or more interface screens and assigned to respective question and answer pairings, wherein a second user can submit an up vote or a down vote through one or more interface screens.

11. The computer-implemented method of claim 10, wherein the computing device normalizes the down votes.

12. A computer-implemented method, the computer-implemented method being executed by a computing device executing programmed instructions stored in a memory and comprising:
the computing device inputting electronic text-based tax question and answer pairings into a content model;
the computing device executing programmed instructions of the content model and generating respective content scores for each electronic text-based tax question and answer pairing, wherein generating respective content scores further comprises electronically extracting text from each electronic text-based tax question and answer pairing;
the computing device separating the electronic text-based tax question and answer pairings into product question and answer pairings and general tax question and answer pairings based on respective content scores generated by execution of the content model;
the computing device executing programmed instructions of a machine learning answer quality model and generating respective answer quality scores for each product question and answer pairing and for each general tax question and answer pairing, wherein the answer quality scores are based in part on the answer quality model being executed with inputs comprising respective content scores and votes assigned to each question and answer pairing, wherein the votes comprises one of up votes and down votes;
the computing device generating a Frequently Asked Question (FAQ) list for at least one of the product question and answer pairings and at least one of the general tax question and answer pairings based in part on respective answer quality scores; and
providing access to a first FAQ list for at least one of the product question and answer pairings through first networks in response to first browser requests by first users of a first group of users such that the first FAQ list is presented through first displays of first computing devices of the first users, and providing access to a second FAQ list for at least one of the general tax question and answer pairings through second networks in response to second browser requests by second users of a second group of users such that the second FAQ list is presented through second displays of second computing devices of the second users.

13. The computer-implemented method of claim 12, wherein each content score comprises a number within a pre-defined range.

14. The computer-implemented method of claim 13, wherein one end of the pre-defined range corresponds to product content and another end of the pre-defined range corresponds to general tax content.

15. The computer-implemented method of claim 12, further comprising the computing device removing substantially duplicate question and answer pairings from at least one of the first FAQ list and the second FAQ list.

16. The computer-implemented method of claim 12, wherein the votes assigned to each respective question and answer pairing comprises a down vote fraction.

17. The computer-implemented method of claim 12, wherein the answer quality scores are based on one or more from a group consisting of: length of an answer, assertiveness of the answer, presence of web link in the answer, platform, and question in the answer.

18. The computer-implemented method of claim 12, wherein the computing device normalizes the down votes.

19. A computing system for managing questions and answers on a computer-hosted service comprising:
a database comprising electronic text-based tax question and answer pairings;
a computing device in communication with the database and configured or programmed to receive the electronic text-based tax question and answer pairings stored in the database; and
a content model comprising computer executable instructions stored in a memory of the computing device and executable by a processor of the computing device, the computing device being configured or programmed to:
input electronic text-based tax question and answer pairings into the content model,
generate respective content scores for each electronic text-based tax question and answer pairing, wherein generating respective content scores further comprises electronically extracting text from each electronic text-based tax question and answer pairing,
input one or more attributes into a machine learning answer quality model, wherein at least one of the one or more attributes is the respective content scores and a log of a character length of each answer in the electronic text-based tax question and answer pairings;
generate, by the machine learning answer quality model, output including answer quality scores such that each answer in the electronic text-based tax question and answer pairings is assigned an answer quality score;
separate the electronic text-based tax question and answer pairings into product question and answer pairings and general tax question and answer pairings based on the respective content scores generated by execution of the content model,
provide access to the product question and answer pairings, based at least on the answer quality scores, to a first group of users through first networks in response to first browser requests from first computing devices of first users of the first group such that the product question and answer pairings are presented through first displays of the first computing devices of the first users; and provide access to the general tax question and answer pairings, based at least on the answer quality scores, to a second group of users, different from the first group of users, through second networks in response to second browser requests from second computing devices of second users of the second group such that the general tax question and answer pairings are presented through second displays of second computing devices of the second users.

\* \* \* \* \*